(12) United States Patent
Camp, Jr. et al.

(10) Patent No.: US 6,621,876 B2
(45) Date of Patent: Sep. 16, 2003

(54) SYSTEM AND METHOD TO REDUCE PHASE MODULATION BANDWIDTH

(75) Inventors: William O. Camp, Jr., Chapel Hill, NC (US); Martin Isberg, Lund (SE)

(73) Assignee: Ericsson Inc., Research Triangle Park, NC (US)

(*) Notice: Subject to any disclaimer, the term of this patent is extended or adjusted under 35 U.S.C. 154(b) by 384 days.

(21) Appl. No.: 09/797,346

(22) Filed: Mar. 1, 2001

(65) Prior Publication Data

US 2002/0122467 A1 Sep. 5, 2002

(51) Int. Cl.[7] .............................................. H04L 27/20
(52) U.S. Cl. ...................... 375/296; 375/302; 332/144; 455/110
(58) Field of Search .................... 375/146, 271, 375/278, 279, 284, 285, 290, 296, 297, 302, 308; 332/103, 144, 123; 455/42, 110

(56) References Cited

U.S. PATENT DOCUMENTS

| | | | |
|---|---|---|---|
| 5,541,953 A | | 7/1996 | Hiben et al. |
| 5,633,893 A | | 5/1997 | Lampe et al. |
| 5,818,867 A | * | 10/1998 | Rasmussen et al. ........ 375/146 |
| 5,822,362 A | | 10/1998 | Friedmann |
| 5,987,072 A | | 11/1999 | Kawabata |
| 6,320,914 B1 | * | 11/2001 | Dent .......................... 375/302 |
| 6,459,742 B1 | * | 10/2002 | Marque-Pucheu et al. .. 375/308 |

* cited by examiner

*Primary Examiner*—Amanda T. Le
(74) *Attorney, Agent, or Firm*—Coats & Bennett, P.L.L.C.

(57) ABSTRACT

A signal source generates a phase-modulated output signal responsive to a phase-modulation signal. A phase splitter splits the phase-modulated output signal into two or more phase-offset output signals. A switch provides a selected one of the phase-offset output signals from the phase splitter to a transmit amplifier circuit. Large phase transitions in the phase-modulation signal are detected and reduced to decrease modulation bandwidth requirements at the signal source. When a phase transition in the phase-modulation signal is reduced, the switch is coherently switched from one phase-offset output signal to another to substantially restore the full phase transition in the output signal presented to the transmit amplifier circuit. In this manner, the transmit amplifier receives substantially the same phase transitions as are in the original phase-modulation signal.

30 Claims, 9 Drawing Sheets

SYSTEM AND METHOD TO REDUCE PHASE MODULATION BANDWIDTH

BACKGROUND OF THE INVENTION

The present invention generally relates to wireless communication systems, and particularly relates to RF signal modulation.

Wireless communication systems, such as the mobile communication networks that support cellular telephone communications, impose a number of engineering challenges. The desire to support an increasing number of users within a finite radio frequency spectrum, and to provide ever smaller and more capable mobile terminals, challenges both system and component designers. Not all of these challenges are immediately obvious. A layperson might appreciate the difficulty of physically fitting a modern cellular phone into an increasingly small package, but might completely miss the varied challenges associated with increasing its operating efficiency in the quest for greater battery life.

As with many complex undertakings, solving the real problem of interest requires solving a number of related, sometimes ancillary problems. The challenges associated with increasing RF transmitter efficiency are varied and often subtle. For example, the need to increase spectral efficiency—bandwidth usage—in the interest of supporting more users has prompted development of several digital modulation schemes. These modulation schemes often involve both amplitude and phase or frequency modulation. Transmit amplifiers generally must respond linearly to the amplitude modulation information. This fact suggests the use of a linear transmit amplifier, yet a linearly biased power amplifier in general operates at a lower efficiency than one biased for saturated mode operation.

One approach to increasing transmitter efficiency entails generating separate modulation signals, a phase modulation signal and an associated amplitude modulation signal, for example. By generating the phase modulation signal with a constant-envelope, a saturated mode power amplifier can amplify it without appreciable distortion. The associated amplitude modulation signal can then be used to vary the output signal level from the power amplifier coherently with the phase modulation information contained in the output signal. In this manner, the saturated mode power amplifier may be made to generate a transmit signal with the desired phase and amplitude modulation information. One consequence of "unwrapping" the phase or frequency modulation information from the amplitude modulation information can result in relatively high bandwidth phase modulation signals.

BRIEF SUMMARY OF THE INVENTION

The present invention includes methods and apparatus for reducing phase-modulation bandwidth requirements in a radio frequency transmitter. A phase information signal contains a sequence of phase values corresponding to a desired sequence of transmit symbols. Phase transitions between successive phase values that exceed a certain magnitude, or fall within one or more defined ranges, are reduced to lower the bandwidth of the phase information signal. A phase-modulated output signal is generated using the lowered-bandwidth phase information signal. Phase transitions in the phase-modulated output signal corresponding to the reduced phase transitions in the lowered-bandwidth phase information signal are restored to what they would have been without bandwidth reduction. This effectively restores the full value of all phase transitions represented in the original phase information signal to the phase-modulated output signal.

To accomplish the above, an exemplary circuit arrangement includes a signal source, a phase reduction circuit, a phase adjustment circuit and a phase restoration circuit. The phase reduction circuit may operate on successive phase information signal samples to identify phase transitions that exceed a desired magnitude. For example, the phase reduction circuit may be configured to detect phase transitions in the range of 180° in the phase information signal. Upon detecting a phase transition within this range, it generates a control signal to the phase adjustment circuit. The signal is timed so that the phase adjustment circuit, which receives the successive phase values of the phase information signal, effectively subtracts 180° from the offending phase transition. It may do so by adjusting the involved sample values in the phase information signal. The adjusted phase information signal phase modulates a signal source, which produces a phase-modulated output signal.

The phase restoration circuit couples the phase-modulated output signal to a phase modulation input of a transmit amplifier. It restores the reduced phase transitions in the phase-modulated output signal by adding or subtracting an amount of phase transition associated with the amount reduced in phase reduction operations. It adds or subtracts phase transitions to the phase-modulated output signal at times keyed to operation of the phase reduction circuit. The phase restoration circuit may comprise one or more phase splitters to create one or more phase-offset versions of the phase-modulated output signal. An included switch can then switch between the phase-offset signals to impart the desired amount of phase transition. Preferably, the phase reduction circuit synchronizes phase reduction and restoration functions using one or more control signals.

In general, the phase reduction circuit may be configured to reduce phase transitions that exceed an arbitrary threshold. For example, it may limit the maximum allowed phase transition input to the signal source to 45°. Thus, a phase transition of, say, 140°, would be reduced to 5° by reducing the transition magnitude by 135° (three times 45°). For this phase transition, the signal source is modulated by a phase transition of only 5°, rather than the original 135° of transition. In conjunction, the phase restoration circuit would be signaled at the appropriate time to switch between the appropriate phase offset signals such that the "lost" 135° of phase transition is restored to the phase-modulated output signal. The phase modulated signal with the restored phase transition is provided to the transmit amplifier for use in generating a transmit signal that includes phase information corresponding to the original phase information signal.

DETAILED DESCRIPTION OF THE INVENTION

Figure 1:
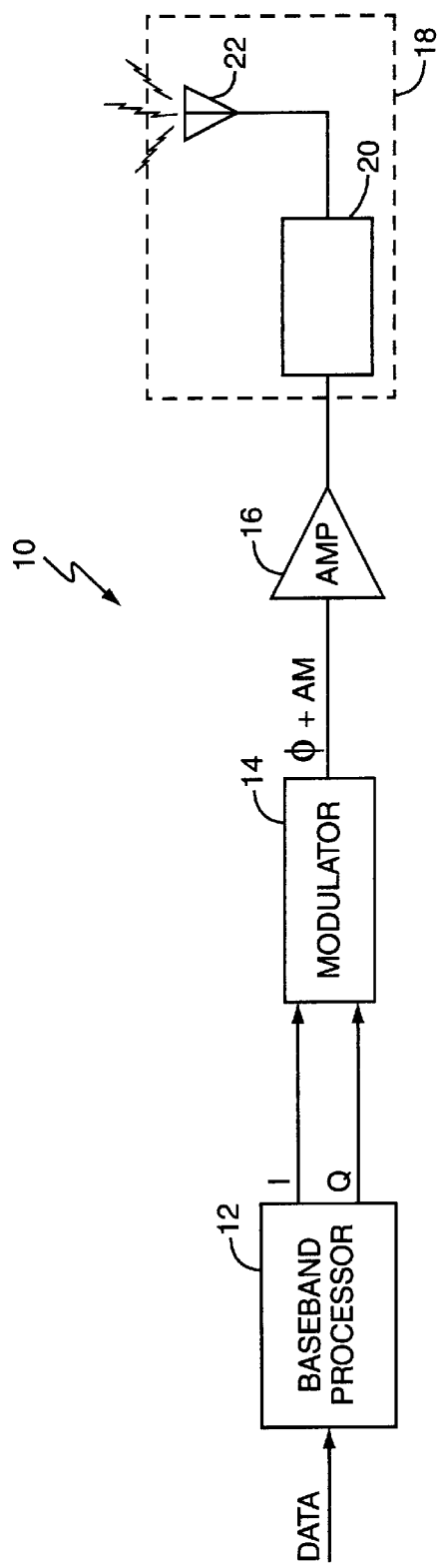
FIG. 1 is a diagram of a typical transmitter operating on a signal with combined amplitude and phase modulation information.

Turning now to the drawings, FIG. 1 is a diagram of a typical radio frequency (RF) transmitter generally indicated by the numeral 10. The transmitter 10 is useful for generating a transmit signal with both phase and amplitude modulation, and includes a baseband processor 12, a modulator 14, and an amplifier circuit 16. The output of the amplifier circuit 16, considered the "transmit" signal, feeds into an antenna assembly 18 that includes a coupling circuit 20 and associated antenna 22.

The baseband processor 12 encodes the input data, typically digitized speech signals and other data, into in-phase (I) and quadrature (Q) baseband signals. The modulator 14 generates an amplifier input signal that includes both phase and amplitude modulation information from the I and Q baseband signals. The amplifier circuit 16 typically operates as a linear amplifier so that the amplitude and phase modulation information in the amplifier input signal is reproduced with high fidelity in the amplified output signal (the transmit signal). Because the amplifier circuit 16 must be biased for linear mode operation, its efficiency suffers.

Figure 2:
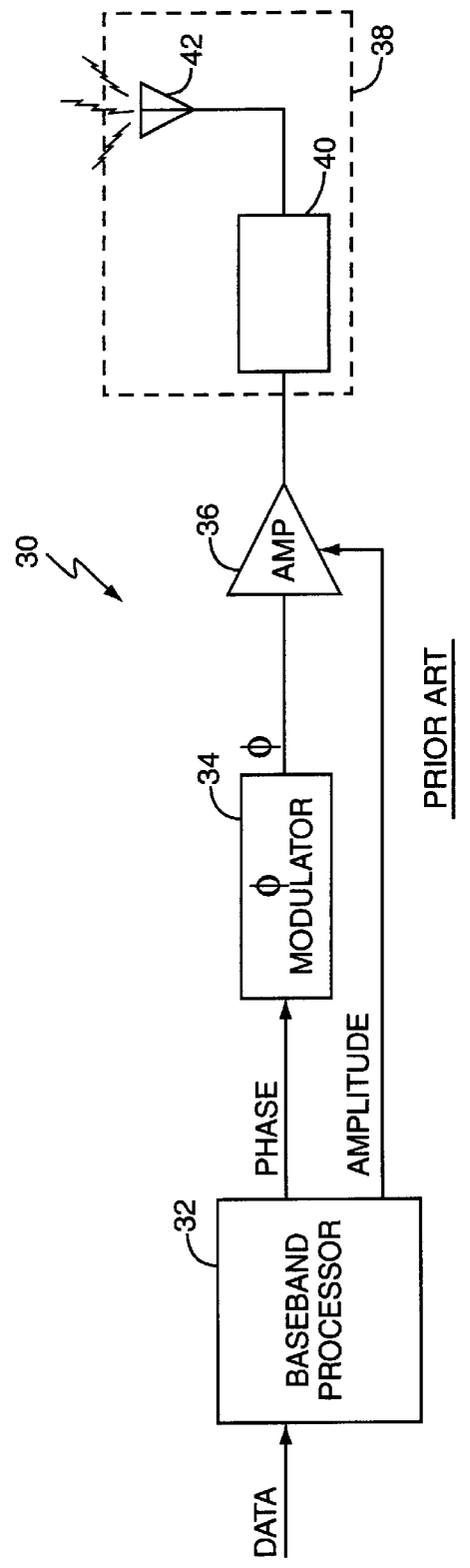
FIG. 2 is a diagram of a typical transmitter operating on separate phase and amplitude modulation signals.

FIG. 2 is a diagram of a typical approach to overcoming much of the inefficiency inherent in the signal amplification approach of FIG. 1. Here, a transmitter 30 includes a baseband processor 32 configured to create separate phase and amplitude modulation signals in accordance with the incoming data (e.g., speech data), and the particular wireless communication air interface standard in use. The transmitter 30 further includes a phase modulator 34, and an amplifier circuit 36. The amplifier circuit 36 generates a transmit signal in accordance with both the amplitude and phase modulation information generated by the baseband processor 32. An associated antenna assembly 38 includes a coupling circuit 40 and antenna 42. The antenna assembly 38 provides for radiation of the transmit signal.

Typically, the phase modulation signal generated by the baseband processor 32 is a constant-amplitude signal. The modulator 34 generates a constant-amplitude, phase-modulated output signal at the desired carrier frequency responsive to the phase modulation signal. The amplifier circuit 36 receives the phase-modulated output signal as an input signal. Absent the need to linearly respond to amplitude variations in this input signal, the amplifier circuit 36 may be operated in a saturated mode, thereby gaining potentially significant improvements in its operating efficiency. The amplitude modulation signal generated by the baseband processor 32 may be used to vary, for example, the operating voltage of the amplifier circuit 36. This action impresses the desired amplitude modulation onto the transmit signal generated by the amplifier circuit 36.

Figure 3:
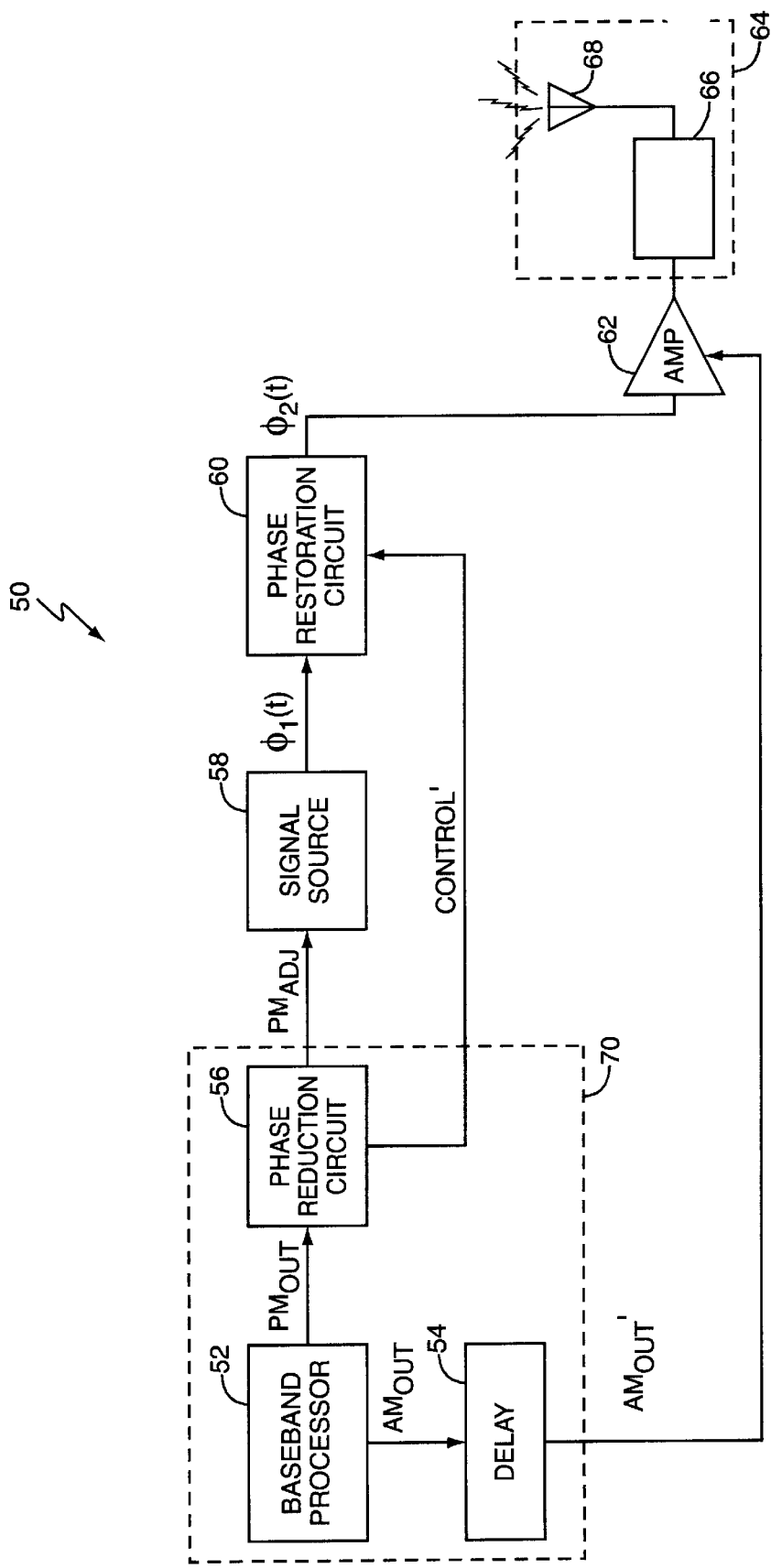
FIG. 3 is a diagram of a transmitter in accordance with the present invention.

FIG. 3 is a diagram of an exemplary transmitter in accordance with the present invention. The transmitter 50 includes a baseband processor 52 and optional delay element 54, a phase reduction circuit 56, a signal source 58, a phase restoration circuit 60, and a transmit amplifier circuit 62. Several elements, including the baseband processor 52, delay element 54, and phase reduction circuit 56, may be included in a digital signal processor (DSP) 70. The amplifier circuit 62 outputs a transmit signal responsive to both amplitude and phase modulation signals, and the associated antenna assembly 64, including coupling circuit 66 and antenna 68, radiates the transmit signal.

In operation, the baseband processor 52 generates synchronized amplitude and phase modulation signals, $AM_{OUT}$ and $PM_{OUT}$, respectively. The phase reduction circuit 56 generates a reduced bandwidth version of the $PM_{OUT}$ signal $PM_{ADJ}$ by reducing the magnitude of selected phase transitions in the $PM_{OUT}$ signal. The signal source 58 generates a phase modulated output signal, $\phi_1(t)$, at the desired carrier frequency based on the reduced-bandwidth phase modulation signal $PM_{ADJ}$. This reduces the modulation bandwidth requirements of the signal source 58, but results in lost phase transition information in the phase modulated output signal $\phi_1(t)$. To restore the lost phase transition information, the phase restoration circuit 60 operates synchronously with the phase reduction circuit 56 to substantially restore the full magnitude of those phase transitions that were selectively reduced by the phase reduction circuit 56. This restoration action generates the final phase modulated output signal, $\phi_2(t)$, which drives the transmit amplifier circuit 62.

The baseband processor 52 generates the amplitude information signal $AM_{OUT}$ and the phase information signal $PM_{OUT}$ in synchronous fashion. The signal path for the phase information signal $PM_{OUT}$ including the phase reduction circuit 56, the signal source 58, and the phase restoration circuit 60, includes a known path delay. To preserve the coherency between the phase and amplitude modulation signals, the delay element 54 may be used to impart an equivalent path delay between the baseband processor 52 and the amplifier circuit 62 for the $AM_{OUT}$ signal. The delayed version of the signal is denoted as $AM'_{OUT}$. Adjusting the delay element 54 accommodates intrinsic path delays with respect to the amplifier circuit 62, such as digital-to-analog conversion of the $AM_{OUT}'$ signal to provide a modulating voltage signal. Thus, time coherency between phase modulations in the $\phi_2(t)$ signal and corresponding amplitude modulations in the $AM'_{OUT}$ signal are preserved by matching the delay of delay element 54 with the overall signal delay of the phase modulation signal path.

Figure 4:
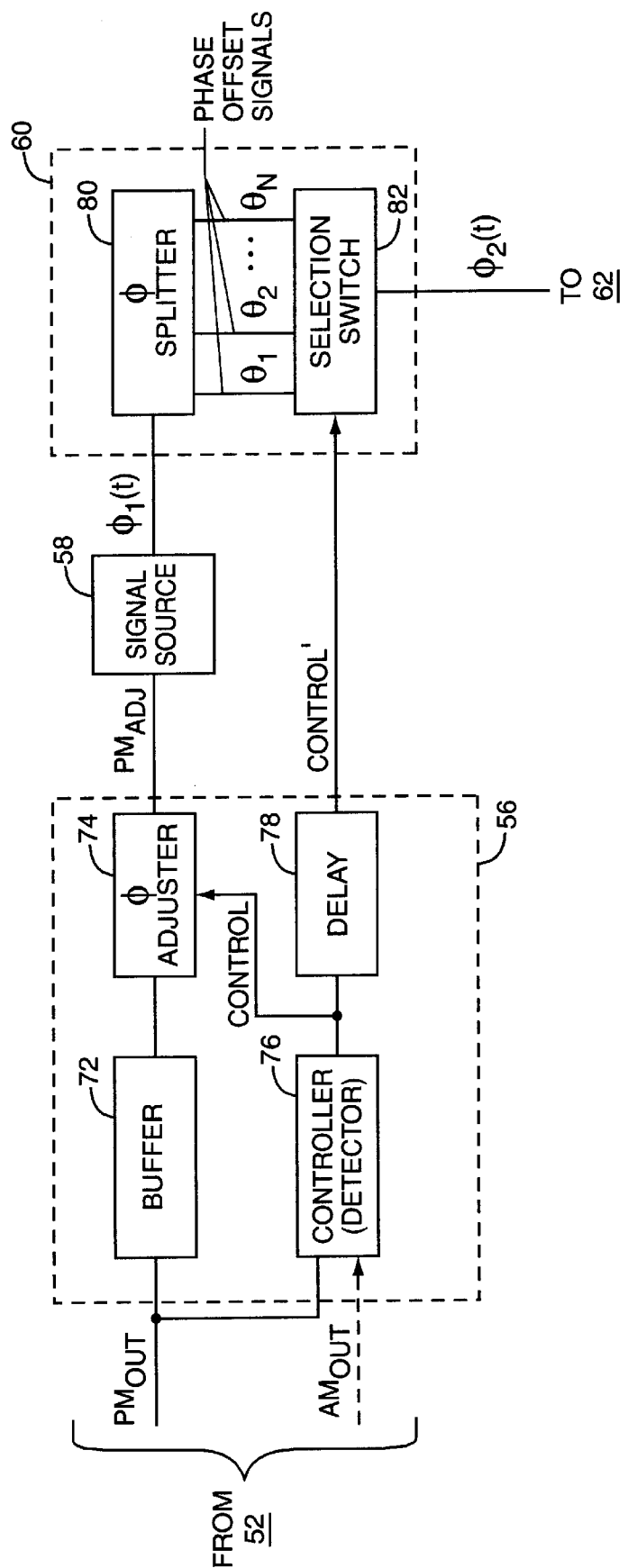
FIG. 4 is a diagram with exemplary details of the transmitter of FIG. 3.

FIG. 4 is a diagram of exemplary details for the phase reduction circuit 56 and phase restoration circuit 60. The phase reduction circuit 56 includes a buffer 72, a phase adjustment circuit 74, a controller 76, and a delay element 78. The phase restoration circuit 60 includes a phase splitter 80, and a selection switch 82. As noted, the phase reduction circuit 56 operates on the $PM_{OUT}$ signal to reduce its bandwidth, thereby alleviating the modulation bandwidth requirements imposed on the signal source 58. With proper configuration of the phase splitter 80 and coordinated operation of the phase reduction circuit 56 and selection switch 82, the phase transition reduction of the phase reduction circuit 56 and subsequent restoration of phase in the phase restoration circuit 60 are essentially transparent with regard to the final phase modulated output signal $\phi_2(t)$. This functionality is explained in more detail below.

Typically, the baseband processor 52 outputs a phase-modulation signal and a corresponding amplitude modulation signal based on the input data and the particular modulation scheme in use. The phase and amplitude modulation signals generated by the baseband processor 52 are coherent. That is, the two signals are aligned in time. Generally, digital modulation schemes represent digital data using symbols. Some modulation schemes combine phase shift keying (PSK) with amplitude modulation to convey more bits of information per transmitted symbol. Quadrature amplitude modulation (QAM) is an example of this type of modulation scheme. Using such techniques, each transmitted symbol is represented by a unique pairing of phase and amplitude values. Thus, the baseband processor 52 separates phase and magnitude information for successive transmit symbols into corresponding phase and amplitude modulation signals.

The phase modulation signal $PM_{OUT}$ from the baseband processor 52 is buffered by the buffer 72, which shifts successive sample values of the $PM_{OUT}$ signal through to the phase adjustment circuit 74. In a typical implementation, the baseband processor 52 operates on an oversampled basis. That is, each transmit symbol's phase value is generated as a set of digital sample values. For example, with eight-times (8×) oversampling, the phase of each transmit symbol is represented by a set of eight digital samples. In this example, then, the $PM_{OUT}$ signal includes eight digital samples per transmit symbol. The buffer 72 is typically configured to hold sample values for several symbols. With 8× oversampling for example, the buffer 72 would thus have a register depth D equal to twenty-four. That is, the buffer 72 would have twenty-four successive registers to hold phase value samples for up to three transmit symbols at eight sample values per transmit symbol.

The controller 76 is configured to examine sample values or groups of sample values within the buffer 72 to detect symbol-to-symbol phase transitions that exceed a defined limit. When such phase transitions are detected, the controller 76 provides a control signal to the phase adjustment circuit 74. In response, the phase adjustment circuit 74 modifies the sample values corresponding to the offending phase transition, effectively removing a defined amount of phase transition from the involved sample values. Thus, the phase adjustment circuit 74 generates the adjusted phase modulation signal, $PM_{ADJ}$, such that it has a lower bandwidth than the input phase modulation signal $PM_{OUT}$. The lower bandwidth $PM_{ADJ}$ signal drives the signal source 58, which in turn generates the phase-modulated output signal $\phi_1(t)$.

By operation of the phase adjustment circuit 74, the output signal $\phi_1(t)$ from the signal source 58 does not contain phase transitions that exceed the configured detection threshold of the controller 76. Thus, absent further operation, the $\phi_2(t)$ provided to the amplifier circuit 62 by the switch 82 would not contain the desired phase modulation information as represented by sample values in $PM_{OUT}$ signal generated by the baseband processor 52. The controller 76 uses the selection switch 82 to restore the original magnitude to the minimized phase transitions in the phase-modulated output signal $\phi_1(t)$ from the signal source 58.

To accomplish this, the phase splitter 80 is configured in accordance with the detection threshold of the controller 76. For example, if the controller 76 is configured to detect and substantially eliminate phase transitions in the range of 180°, then the phase splitter 80 may be configured with two outputs, one output having 0° of phase shift with respect to the phase-modulated output signal from the signal source 58, and the other having 180° of phase shift. Thus, at points in the phase-modulated output signal $\phi_1(t)$ where 180° phase shifts have been removed, the controller 76 causes the switch 82 to change from one phase splitter output to the next. This has the effect of causing a 180° phase change in the $\phi_2(t)$ signal provided to the amplifier.

The controller 76 operates the switch 82 coherently with respect to sample value adjustments made by the phase adjustment circuit 74. That is, the switch 82 is made to switch between phase splitter outputs at the correct time with respect to the adjusted sample values. Typically, the phase modulation signal $PM_{OUT}$ is a stream of successive digital words having a bit width defined by system requirements. The phase adjustment circuit 74 operates on the delayed digital values output from the buffer 72, and presents the adjusted phase modulation signal, $PM_{ADJ}$, to the signal source 58 as a stream of successive digital values. The signal source 58, operating as a phase modulator, generally outputs $\phi_1(t)$ as a fixed-amplitude analog signal at the desired carrier frequency. Thus, the phase splitter 80 and switch 82 are typically configured as analog circuit components. However, the overall structure may be may be changed so that more or less of its elements are digital or analog in nature.

In any case, there is a known delay between a sample value at a given position in the buffer 72, and a corresponding phase transition in the phase-offset signals derived from the $\phi_1(t)$ signal by the phase splitter 80. This delay includes the digital delay of the buffer 72, which is a function a buffer length and sample rate, as well as all circuit delays through the balance of the signal path between the buffer 72 and the switch 82.

Essentially, the controller 76 operates as detection logic by detecting sample values in the buffer 72 representing a phase transition that should be reduced. The controller 76 generates the control signal at a time when the sample values in question arrive at the phase adjustment circuit 74. The delay element 78 delays the control signal with respect to the switch 82, to account for the path delays between the adjustment circuit 74 and the switch 82. In this way, phase restoration circuit 60 restores the desired phase transitions to the $\phi_2(t)$ signal with the proper timing. The delay element 78 can be incorporated into the controller 76 and made adjustable to, for example, compensate for variable switching delays in the switch 82.

The control signal may be a digital or analog signal, and its particular characteristics depend on the overall configuration of the phase reduction circuit 56. For example, if the phase splitter 80 provides 0°, +90°, −90°, and 180° phase-offset outputs, the control signal may be a two-bit digital signal indicating the appropriate output to select. In any case, the format of the control signal should support proper operation of the phase reduction circuit 74. In some instances, it may be more efficient to generate separate but coordinated control signals for the phase reduction circuit 74 and the switch 82.

When configured to detect phase transitions in the range of 180°, the controller 76 acts as a "zero crossing" detector, because 180° phase transitions pass through the zero phase axis. Because amplitude modulation minima correspond to these zero crossings, the controller 76 might simply look for minimums in the amplitude modulation signal $AM_{OUT}$ generated by the baseband processor 52. In general, however, the controller 76 detects phase transitions that exceed an arbitrary limit based on examining sample values in the buffer 72.

As noted, the phase splitter 80 is configured based on the magnitudes of phase transitions that will be adjusted by the phase reduction circuit 74. For example, the phase reduction circuit 56 might be configured to reduce all phase transitions in excess of 45°. The phase splitter 80 might provide phase-offset outputs having phase offsets of 0°, +45°, −45°, +90°, −90°, +135°, −135°, and 180° relative to the $\phi_1(t)$ signal from the signal source 58. With this phase splitter configuration, the controller 76 can impart phase shifts ranging in magnitude from 0° to 180° in the φ2(t) signal via the switch 82, in steps as small as 45° (e.g., the minimum phase shift between phase splitter outputs). The switch 82 may be regarded as a multiplexer selecting a particular one of the phase-offset signals for connection to the amplifier circuit 62 based on the state of the control signal from the phase reduction circuit 56. Thus, the switch 82 effectively restores the original phase transitions that were reduced by the phase reduction circuit 56 to the phase-modulated output signal φ₁(t), produced by the signal source 58.

Figure 5:
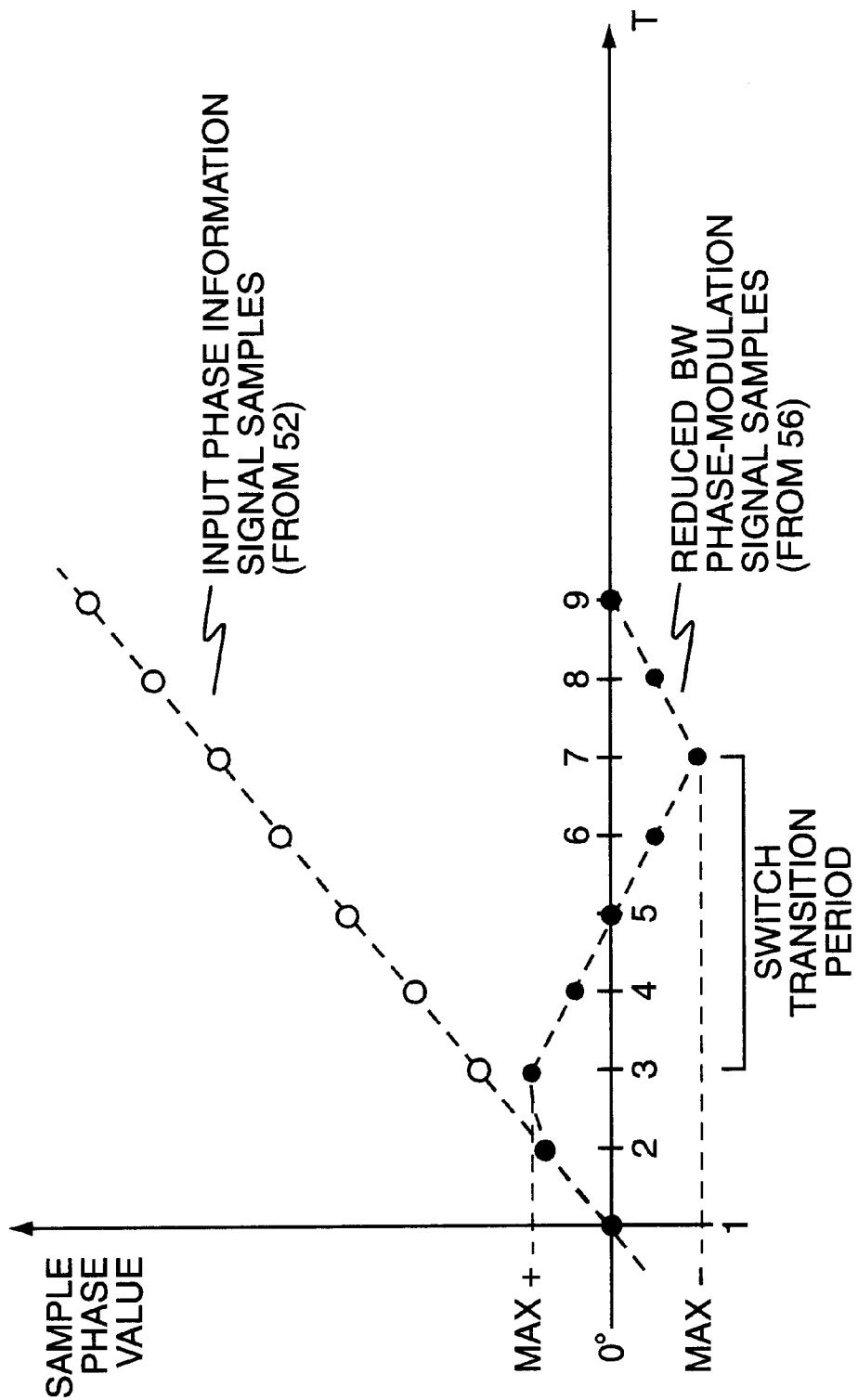
FIG. 5 is a diagram of exemplary phase transition magnitude reduction associated with the present invention.

FIG. 5 illustrates typical operation of the phase reduction circuit 74. The horizontal axis represents time, while the vertical axis represents relative sample phase value. In the example, the controller 76 is configured to detect phase transitions in the range of 180°, and eight sample values are used in the phase modulation signal $PM_{OUT}$ to represent phase transitions. The detection range might, for example, span phase transitions from about 150° to about 210°. That is, the controller 76 may be configured to detect and minimize incoming phase transitions in the $PM_{OUT}$ signal that fall within that range.

The open circles represent input signal samples of $PM_{OUT}$ and track a 180° phase transition. The filled circles represent corresponding adjusted phase modulation signal samples for the $PM_{ADJ}$ signal. Note that the total number of samples depicted includes nine samples, emphasizing the fact that the phase reduction circuit 56 can operate across transmit symbol boundaries in the phase modulation signal $PM_{OUT}$. Upon recognizing that the set of input samples essentially represents a phase transition that falls within the detection range (e.g., 180°), the controller 76 asserts the control signal at the appropriate time, causing the phase reduction circuit 74 to subtract an incremental amount of the unwanted 180° phase change from successive input signal samples.

In the example, the phase reduction circuit 74 begins subtracting a fraction of 180° at input sample 3, with the incremental subtraction performed on a per-sample basis through input sample 7. This action defines the maximum positive (MAX+) and maximum negative (MAX−) phase value permitted by the phase reduction circuit 72. The subtraction period may correspond to the required transition time of the switch 82. The amount subtracted per sample is generally chosen to evenly space out the phase subtraction over the involved samples to minimize the bandwidth associated with the residual transition in the adjusted phase-modulation signal.

Figure 6:
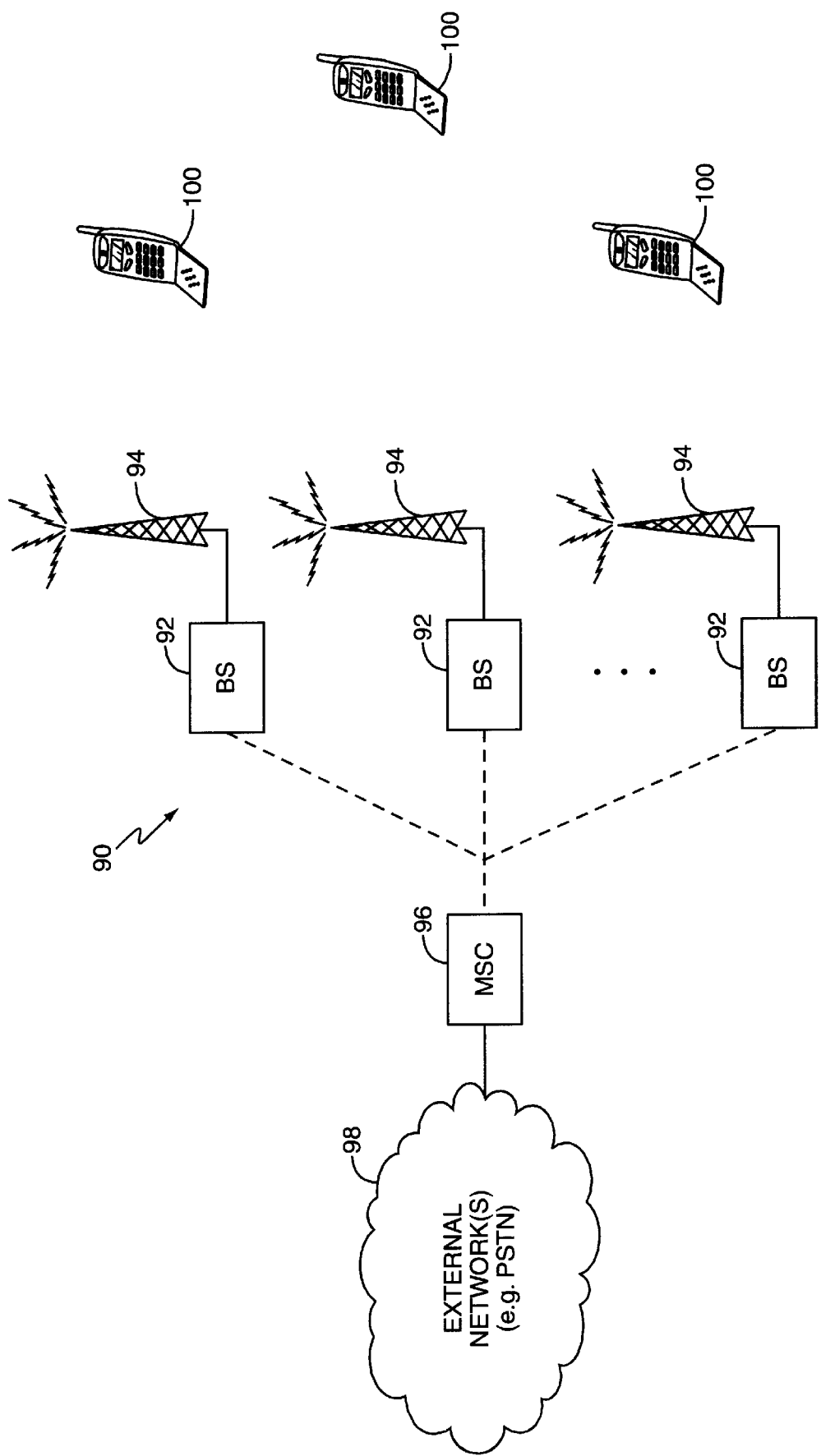
FIG. 6 is a diagram of a mobile network for wireless communication.

While the present invention has broad applicability to RF signal modulation in general, it has particular utility in RF-based communication systems. FIG. 6 depicts a wireless mobile network 90, such as radiotelephone cellular network, in which the present invention may be advantageously used. The mobile network 90 includes one or more base stations 92 and associated antennas 94, and one or more mobile switching centers (MSCs) 96 to interface users of mobile terminals 100 with users of one or more external communication networks 98. The external network(s) 98 may include but is not limited to the Public Switched Telephone Network (PSTN), the Integrated Services Digital Network (ISDN), and the Internet. Transmit signal-generating equipment in the base stations 92 and mobile terminals 100 might advantageously incorporate aspects of the present invention.

The mobile terminals 100 communicate with a supporting base station 92 via RF signaling in accordance with a selected air interface standard. Common signaling standards include TIA/EIA-136, IS-95, Global Services for Mobile communications (GSM), and variants thereof. Together, the base stations 92 and MSCs 96 allow users of the mobile terminals 100 to communicate with other mobile terminal users, as well as users associated with the one or more external networks 98.

Figure 7:
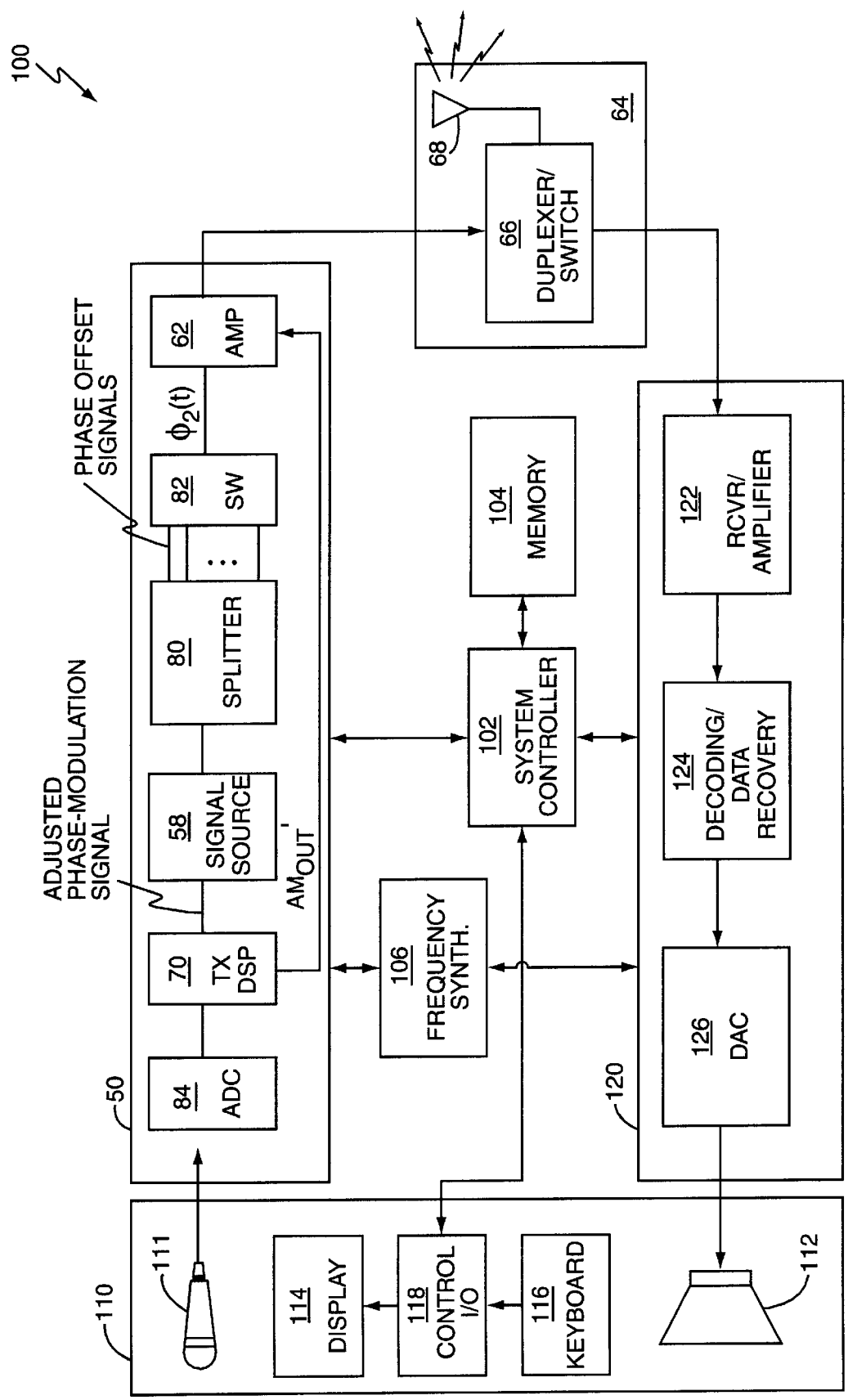
FIG. 7 is a diagram of a mobile terminal for use in the mobile network of FIG. 5.

FIG. 7 depicts a mobile terminal 100 for use in the mobile network 90. The mobile terminal 100 includes the transmitter 50 and antenna assembly 64 discussed above, a system controller 102, memory 104, a frequency synthesizer 106, a user interface 110, and a receiver 120.

In operation, the mobile terminal 100 sends and receives information via radio frequency signaling between it and a supporting base station 92. The system controller 102 is typically implemented as one or more microcontrollers (MCUs) that manage the user interface 110, and provide overall control of the mobile terminal 100. The memory 104 generally includes application software, default values for constants used in operation, supporting information relevant to the air interface standard(s) used, and working space for data.

The user interacts with the mobile terminal 100 via the user interface 110. The microphone 111 converts user speech signals into a corresponding analog signal, which is provided to the transmitter 50 for subsequent conversion, processing, and transmission to the remote base station via the antenna assembly 64. The receiver 120 receive signals from the supporting base station 92 and extracts received audio information, e.g., speech from a remote user, and provides an audio signal for driving a speaker 112 included in the user interface 110. The user interface 110 further includes a display 114 for providing visual information to the user, and a keypad 116 for accepting commands and data input from the user. In short, the user interface 110 allows the user to send and receive speech and other audio information, to dial numbers, and to enter other data as needed.

The receiver 120 includes a receiver/amplifier 122, a decoding/data recovery module 124, and a digital-to-analog converter (DAC) 126. In operation, signals are received via the antenna 68. In general, the coupling circuit 66 in the antenna assembly 64 couples the receiver 120 and transmitter 50 to the antenna 68. If the mobile terminal 100 is designed to operate in half-duplex receive/transmit modes, the coupling circuit 66 may include any required matching circuits and a switch for alternately coupling the receiver 120 and the transmitter 50 to the antenna 68. More commonly, the mobile terminal 100 is also designed to work in full-duplex receive/transmit modes, and includes a duplexer for isolating the receive signal from the transmit signal.

Received signals are routed to the receiver/amplifier 122, which provides conditioning, filtering, and down conversion of the received signal. In digital implementations, the receiver/amplifier 122 may use analog-to-digital converters (ADCs) to provide the decoding/data recovery module 124 with successive digital values corresponding to the incoming received signal. The decoding/data recovery module 124 recovers the speech and control information encoded in the received signal, and provides the DAC 126 with digital values corresponding to the received speech information. In turn, the DAC 126 provides an analog output signal suitable for driving the speaker 112. Received control information is typically routed to the system controller 102 for action. The receiver/amplifier may use one or more frequency reference signals from the frequency synthesizer 106 in down-converting the received signal.

The transmitter 50 includes an ADC 84, and a transmitter DSP 70 in accordance with the above discussion of FIG. 3.

That is, the DSP 70 includes the functionality of the baseband processor 52, delay element 54, buffer 72, phase reduction circuit 74, controller 76, and delay element 78. Note also that the DSP 70 may further include the received signal processing functions associated with the decoding/data recovery module 124 of the receiver 120. As before, the transmitter 50 further includes the signal source 58, the phase splitter 80, the switch 82, and the amplifier circuit 62. Note that the signal source 58 may derive the carrier frequency signal it generates from one or more reference signals provided to it by the frequency synthesizer 106. It is this carrier frequency signal that the signal source 58 modulates with the lowered bandwidth phase information signal from the phase reduction circuit 56.

The DSP 70 receives digitized audio signals (e.g., speech) from the ADC 82 and, in accordance with the modulation standard used, encodes this digitized data into corresponding phase and amplitude modulation signals ($PM_{ADJ}$ and $AM'_{OUT}$). The DSP 70 may also receive other data for transmission, such as data entered by a user via the user interface 110. The DSP 70 drives the signal source 58 with the adjusted phase modulation signal $PM_{ADJ}$, and controls the switch 82 to restore the full magnitude of the phase transitions in the final phase-modulated output signal $\phi_2(t)$ provided to the amplifier circuit 62. This is accomplished by switching between the appropriate phase-offset signals at the appropriate time. As before, the amplifier circuit 62 generates a transmit signal responsive to both the $AM'_{OUT}$ and $\phi_2(t)$ signals. Thus, the transmit signal, which is coupled to the antenna assembly 64, includes the desired amplitude and phase modulation information as generated by the DSP 70.

Figure 8A:
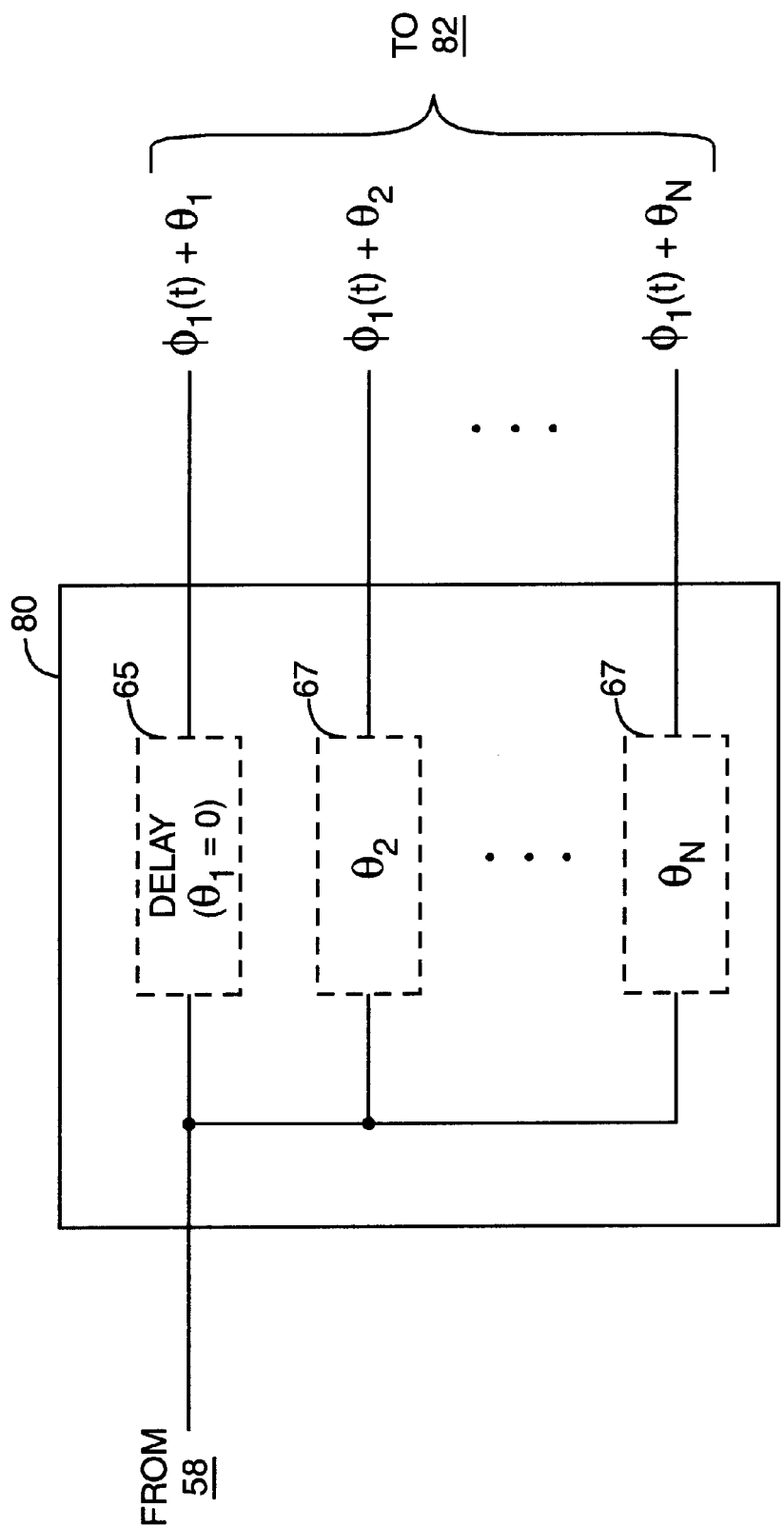
FIGS. 8A–8D depict exemplary configurations for the phase splitter used in the transmitter of FIG. 4.

FIG. 8A is a diagram of a general phase splitter 80. The phase splitter 80 includes a delay 65, and one or more phase shifters 67. The delay element 65 is optional and may be used to match the delay of the 0° phase-offset signal with that of the other phase-offset signals. However, the delay element 78 or DSP 70 may be configured to accommodate variable delays in the switch 82.

Depending upon the configuration and number of phase shifters 67, the phase splitter 80 may provide input signal buffering (not shown) to prevent placing too great a load on the output signal $\phi_1(t)$ from the signal source 58. Similarly, depending upon the configuration of the phase shifters 67, each phase-offset output signal may have output buffering (not shown). This output buffering might be needed, for example, when the configuration of the phase shifters 67 is such that they have poor output drive capability. Poor output drive capability may be associated with certain passive circuits used in some phase shifter implementations.

Each phase shifter 67 imparts a desired phase shift to the phase-modulated output signal from the signal source 58. If multiple phase shifters 67 are installed, they may be configured such that each successive one imparts a successively greater phase shift (e.g., 45°, 90°, and so on).

Figure 8B:
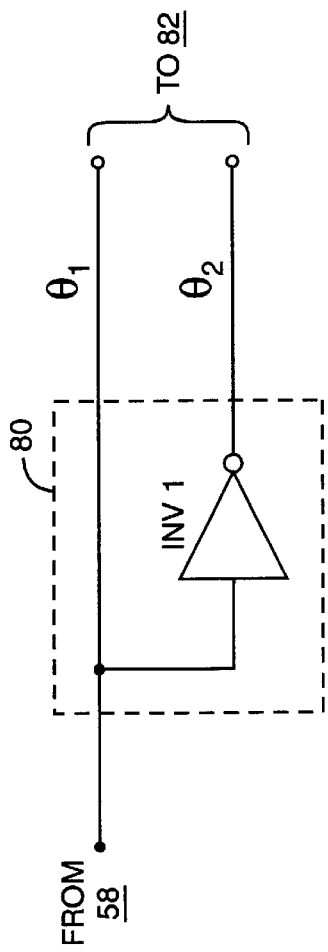
Figure 8D:
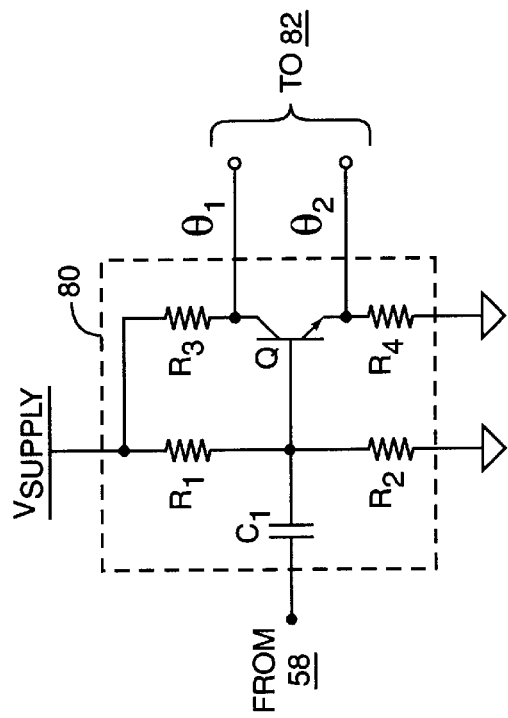
Figure 8C:
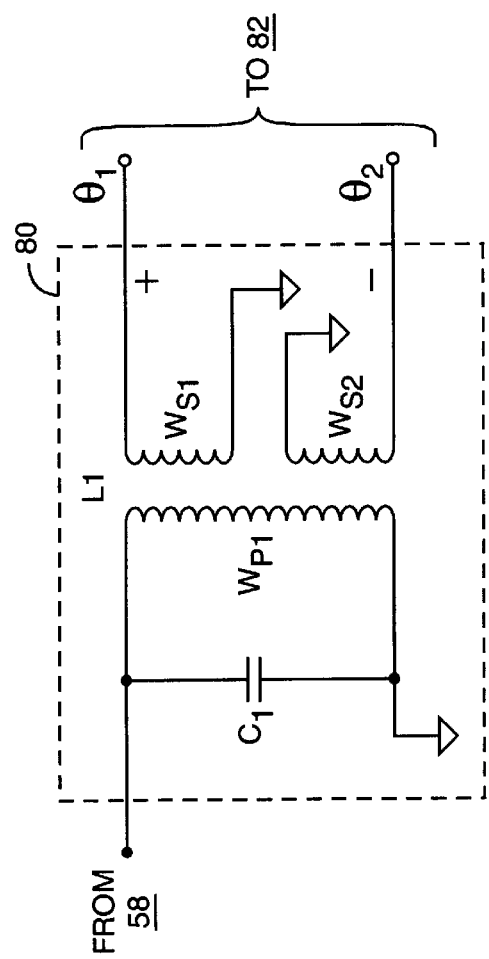

FIGS. 8B–8D illustrate various examples for the phase splitter 80. In FIG. 8B, an inverter serves as a straightforward phase shifter 67, providing 180° of phase shift. In FIG. 8C, a transformer operates as the phase shifter 67. The single primary winding $W_{P1}$ is coupled to two secondary windings $W_{S1}$ and $W_{S2}$, with the two secondary windings having opposite polarities. Finally, in FIG. 8D, a bipolar junction transistor (BJT) Q is configured to provide two phase-offset outputs $\phi_1$ and $\phi_2$, respectively. Of course, the circuits above are only exemplary and subject to change as needed.

Figure 9A:
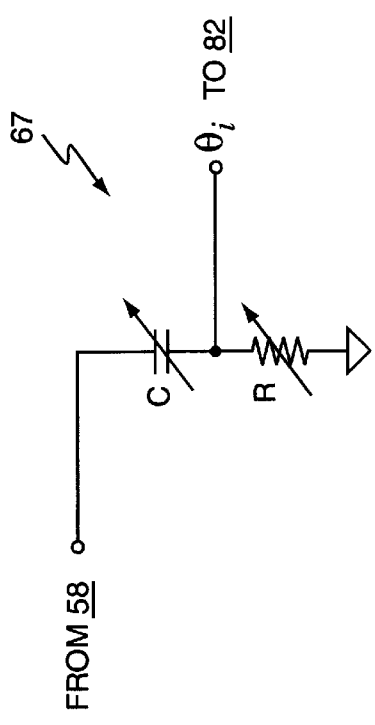
FIGS. 9A–9B depict exemplary configurations for phase shifters for use in the phase splitter of FIG. 4.
Figure 9B:
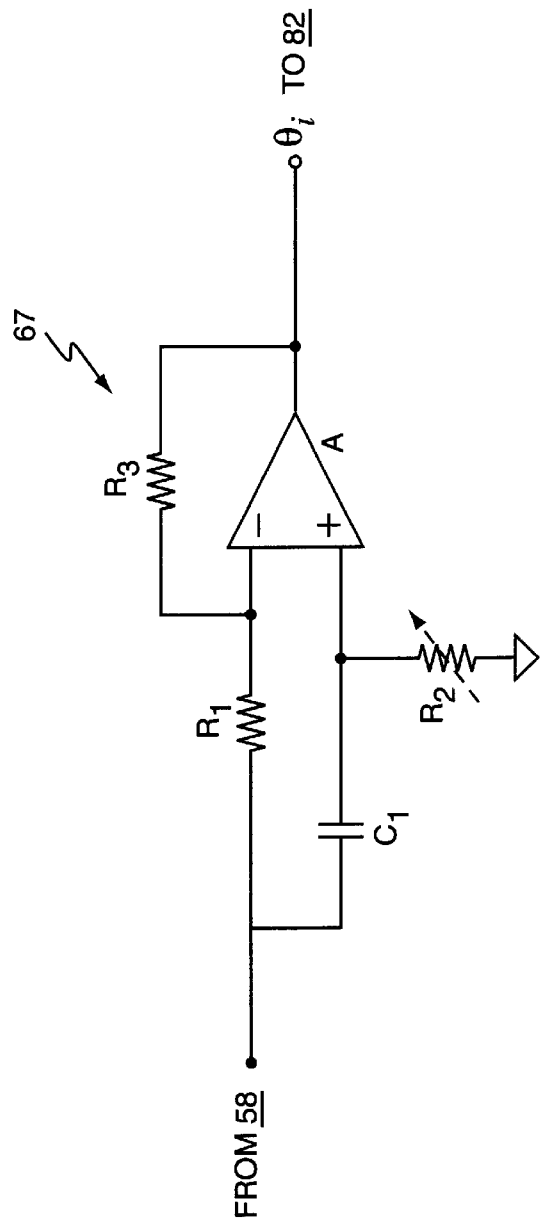

FIGS. 9A and 9B depict more generalized phase shifters 67 that may be configured to impart an arbitrary phase shift.

FIG. 9A shows a passive phase shifter 67 that utilizes a series capacitor C and a shunt resistor R. Either the capacitor C or resistor R may be adjusted to impart the desired phase shift to the phase-offset signal provided by the phase shifter 67. FIG. 9B is an active approach to phase shifting, and includes an amplifier A, an input network including resistors R1, C1, and R2, and a feedback network including R3. The phase shift imparted to the phase-offset signal output by the amplifier A may be set by adjusting the value of R2. Of course, this circuit, like the preceding ones, is subject to much variation.

The present invention may, of course, be carried out in other specific ways than those herein set forth with departing from the scope and essential characteristics of the invention. The present embodiments are therefore to be construed in all aspects as illustrative and not restrictive, and all changes coming within the meaning and equivalency of the appended claims are intended to be embraced herein.

What is claimed is:

1. A phase modulation circuit comprising:
    a signal source receiving a modified phase information signal at an input and generating a phase-modulated output signal at an output;
    a phase reducer to selectively reduce the magnitude of phase transitions in a phase information signal to generate said modified phase information signal with reduced phase transitions at said input of said signal source; and
    a phase restorer responsive to a signal from said phase reducer to restore the magnitude of said reduced phase transitions in said phase-modulated output signal.

2. The phase modulation circuit of claim 1 wherein said phase reducer comprises:
    a detection circuit to detect phase transitions in said phase information signal that exceed at least one predefined limit; and
    an adjustment circuit responsive to a signal from said detection circuit to reduce the magnitude of said phase transitions in said phase information signal that exceed said at least one predefined limit.

3. The phase modulation circuit of claim 2 wherein said phase reducer further comprises an input buffer to sequentially buffer incoming samples of said phase information signal, and further wherein said input buffer is communicatively coupled to said detection circuit.

4. The phase modulation circuit of claim 3 wherein said detection circuit further comprises a controller to examine said incoming samples of said phase information signal held in said input buffer to identify phase transitions in said phase information signal that exceed said at least one predefined limit.

5. The phase modulation circuit of claim 2 wherein said adjustment circuit comprises logic to subtract a defined amount of phase transition from selected samples of said phase information signal.

6. The phase modulation circuit of claim 2 wherein said detection circuit comprises a zero-crossing detector to detect phase transitions in said phase information signal within a defined range of 180° by identifying amplitude minimums in an amplitude information signal coherently generated in association with said phase information signal.

7. The phase modulation circuit of claim 1 wherein said phase information signal is a digital signal containing successive phase value samples corresponding to a desired sequence of transmit symbols, and further wherein said phase reducer comprises:

an input buffer to delay incoming samples of said phase information signal;

a controller to read said input buffer and to generate a control signal when said input buffer contains samples corresponding to a phase transition that exceeds a defined threshold; and a phase adjustment circuit to receive delayed samples of said phase information signal from said input buffer, and, responsive to said control signal, to operate on selected samples corresponding to said phase transition that exceeds said defined threshold to reduce the magnitude of said phase transition by a defined amount.

8. The phase modulation circuit of claim 1 wherein said phase restorer comprises:

a phase splitter to generate at least one phase-offset signal based on phase-shifting said phase-modulated output signal from said signal source by a desired amount; and a selection switch responsive to said signal from said phase reducer to couple a selected one of said phase-modulated output signal and said at least one phase-offset signal to a phase-modulation input of a transmit amplifier.

9. The phase modulation circuit of claim 8 wherein said phase splitter comprises at least one phase shifter to impart said desired amount of phase shift to said phase-modulated output signal.

10. The phase modulation circuit of claim 8 wherein said phase splitter comprises a plurality of phase shifters each imparting a different desired amount of phase shift to said phase-modulated output signal, such that each said phase-offset signal has a different phase-offset with respect to said phase modulation signal.

11. The phase modulation circuit of claim 10 wherein said selection switch comprises a multiplexer with a set of inputs to receive said phase-modulated output signal and said plurality of phase-offset signals, and an output to selectively couple one of said inputs to said transmit amplifier based on said control signal.

12. The phase modulation circuit of claim 1 wherein said phase reducer comprises a portion of a digital signal processor.

13. The phase modulation circuit of claim 1 wherein said signal source comprises a phase-locked loop circuit modulating a carrier frequency signal responsive to said phase information signal.

14. The phase modulation circuit of claim 1 further comprising a baseband processor receiving input data and generating said phase information signal based on said digital data and a defined modulation scheme.

15. The phase modulation circuit of claim 14 wherein said baseband processor and said phase reducer comprise a digital signal processor.

16. A RF transmitter comprising:

a baseband processor to generate a phase information signal based on input data and a defined modulation scheme;

a phase modulation circuit comprising:

a signal source receiving a modified phase information signal at an input and generating a phase-modulated output signal at an output;

a phase reducer to selectively reduce the magnitude of phase transitions in a phase information signal to generate said modified phase information signal with reduced phase transitions at said input of said signal source; and a phase restorer responsive to a signal from said phase reducer to restore the magnitude of said reduced phase transitions in said phase-modulated output signal; and a transmit amplifier with a phase-modulation input coupled to said phase restorer to receive said phase-modulated output signal with restored phase transition magnitudes as a first input signal, said transmit amplifier generating a transmit signal responsive to said first input signal.

17. The RF transmitter of claim 16 wherein said baseband processor generates an amplitude information signal in conjunction with said phase information signal based on said input data and said modulation scheme, and further wherein said transmit amplifier further comprises an amplitude-modulation input to receive said amplitude information signal as a second input signal, said transmit amplifier generating said transmit signal responsive to said second input signal.

18. The RF transmitter of claim 17 wherein a phase modulation signal path delay exists between said transmit amplifier and said baseband processor arising from said phase modulation circuit, and further comprising a compensating delay element in an amplitude modulation signal path between said transmit amplifier and said baseband processor.

19. The RF transmitter of claim 16 wherein said phase reducer comprises:

a detection circuit to detect phase transitions in said phase information signal that exceed at least one predefined limit; and an adjustment circuit responsive to a signal from said detection circuit to reduce the magnitude of said phase transitions in said phase information signal that exceed said at least one predefined limit.

20. The RF transmitter of claim 19 wherein said phase reducer further comprises an input buffer to sequentially buffer incoming samples of said phase information signal, and further wherein said input buffer is communicatively coupled to said detection circuit.

21. The RF transmitter of claim 20 wherein said detection circuit further comprises a controller to examine said incoming samples of said phase information signal held in said input buffer to identify said phase transitions in said phase information signal that exceed said at least one predefined limit.

22. The RF transmitter of claim 19 wherein said adjustment circuit comprises logic to subtract a defined amount of phase transition from selected samples of said phase information signal.

23. The RF transmitter of claim 16 wherein said phase information signal is a digital signal containing successive phase value samples corresponding to a desired sequence of transmit symbols, and further wherein said phase reducer comprises:

an input buffer to delay incoming samples of said phase information signal;

a controller to read said input buffer and to generate a control signal when said input buffer contains samples corresponding to a phase transition that exceeds a defined threshold; and a phase adjustment circuit to receive delayed samples of said phase information signal from said input buffer, and, responsive to said control signal, to operate on selected samples corresponding to said phase transition that exceeds said defined threshold to reduce the magnitude of said phase transition by a defined amount.

24. The RF transmitter of claim 16 wherein said phase restorer comprises:

a phase splitter to generate at least one phase-offset signal based on phase-shifting said phase-modulated output signal from said signal source by a desired amount; and a selection switch responsive to said signal from said phase reducer to couple a selected one of said phase-modulated output signal and said at least one phase-offset signal to a phase-modulation input of a transmit amplifier.

25. A method of reducing phase-modulation bandwidth at a signal source, the method comprising:

identifying phase value transitions in a phase information signal that exceed a predefined limit, said phase information signal corresponding to a desired sequence of transmit symbols;

reducing said identified phase value transitions in said phase information signal to lower the modulation bandwidth of said phase information signal;

modulating said signal source with said phase information signal to generate a phase-modulated output signal, said phase-modulated output signal including reduced phase transitions corresponding to said identified phase transitions that were reduced in said phase information signal; and restoring said reduced phase transitions in said phase-modulated output signal to counter the effects of lowering said modulation bandwidth of said phase information signal.

26. The method of claim 25 wherein reducing said identified phase value transitions in said phase information signal to lower the modulation bandwidth of said phase information signal comprises:

for a given one of said identified phase transitions, determining an amount by which to reduce said given one of said identified phase transitions based on an actual magnitude of said given one of said identified phase transitions; and reducing said actual magnitude by said determined amount.

27. The method of claim 26 wherein determining an amount by which to reduce said given one of said identified phase transitions based on an actual magnitude of said given one of said identified phase transitions comprises:

identifying one of a set of fixed magnitude values nearest to said actual magnitude; and subtracting said identified one of said set of fixed magnitude values from said actual magnitude.

28. The method of claim 26 wherein restoring said reduced phase transitions in said phase-modulated output signal to offset the effects of lowering said modulation bandwidth of said phase information signal comprises, for a given one of said reduced phase transitions in said phase-modulated output signal, restoring an amount of phase transition substantially equal to said amount by which the corresponding one of said identified phase transitions in said phase information signal was reduced.

29. The method of claim 25 wherein restoring said reduced phase transitions in said phase-modulated output signal to offset the effects of lowering said modulation bandwidth of said phase information signal comprises:

identifying phase transitions in said phase-modulated output signal that correspond with said identified phase transitions in said phase information signal that were reduced; and adding back to each said identified phase transition in said phase-modulated output signal an amount of phase transition magnitude substantially equal to the amount by which the corresponding one of said identified phase transitions in said phase information signal was reduced.

30. The method of claim 29 wherein adding back to each said identified phase transition in said phase-modulated output signal an amount of phase transition magnitude substantially equal to the amount by which the corresponding one of said identified phase transitions in said phase information signal was reduced comprises:

generating at least one phase-offset signal at a known phase offset by phase-shifting said phase-modulated output signal; and switching between said phase-modulated output signal and said at least one phase-offset signal to impart phase transitions in a switched phase-modulated output signal equal to said amount of phase transition magnitude to be added back to each said identified phase transition.

* * * * *